Patented June 18, 1940

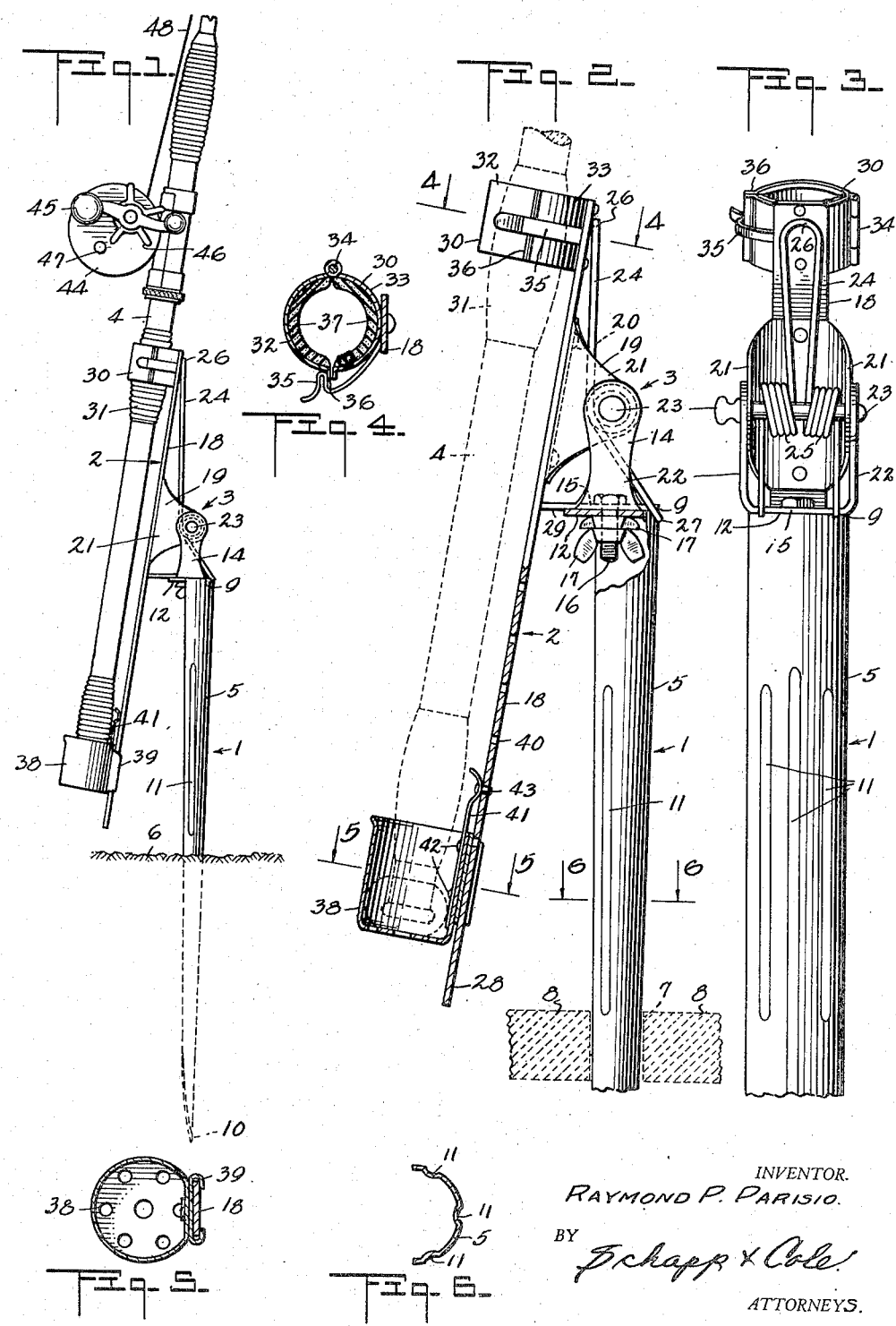

2,204,692

UNITED STATES PATENT OFFICE 2,204,692

FISHING ROD HOLDER

Raymond P. Parisio, Oakland, Calif.

Application October 2, 1937, Serial No. 166,988

5 Claims. (Cl. 248—38)

The present invention relates to improvements in fishing rod holders, and has particular reference to a holder adapted for yieldingly supporting a fishing rod which will allow the rod to follow the direction of pull on the line.

Among the objects of my invention is the provision of a fishing rod holder that will normally retain the rod in a predetermined position, and at the same time will yield in response to a pull on the line, thus preventing the rod or line from being broken by sudden pulling thereon.

It is particularly proposed to provide a device of the character described, which will permit the fishing rod secured thereto to be moved into various angular positions with respect to the normal position of the rod. The latter is movable through both vertical and horizontal angles, and after the pull on the line has been released the holder is made to return the rod to its normal vertical position.

It is further proposed to construct the fishing rod holder in such a manner that a rod may be secured thereto with facility and ease. The holder is made adjustable so as to accommodate fishing rod handles of different lengths and sizes, and at the same time the holder will provide a firm anchorage for the rod.

As the specification continues, it will be noticed that my holder includes a spike adapted to be driven into the ground, or to be wedged into a crack between the boards of a wharf. The holder also may be fastened to part of a boat for trolling, or in fact, to any suitable support, and I do not wish to be limited in this respect.

For a better understanding of my invention, reference should be had to the accompanying drawing, forming part of this application, in which:

Figure 1 is a side elevation of my holder illustrating a fishing rod secured thereto;

Figure 2 is an enlarged view of the central portion of Figure 1, parts being shown in section;

Figure 3 is a front elevation of Figure 2; and

Figures 4, 5, and 6 are transverse sectional views taken along lines 4—4, 5—5 and 6—6, respectively, of Figure 2.

Although I have shown only the preferred form of my invention, I wish to have it understood that various changes or modifications may be made within the scope of the appended claims without departing from the spirit of the invention.

In carrying my invention into practice, I provide a supporting member 1 having a frame 2 secured thereto by means of a universal coupling indicated generally at 3, the frame having a fishing rod 4 removably mounted thereon.

While any suitable supporting member may be utilized, I have shown for this purpose a spike 5. The latter is adapted for driving into the ground 6 as disclosed in Figure 2, or the spike may be wedged in a crack 7 between two wharf boards 8 (see Figure 2). The spike tapers from the upper end 9 to the lower end 10 thereof so as to facilitate introduction of the spike into its anchorage.

The spike is further illustrated as being semicylindrical in cross-section, see Figure 6, and I fashion the spike with reinforcing ribs 11 extending lengthwise thereof. This provides a spike of light weight and at the same time the spike is rigid in construction.

On the top of the spike I provide a horizontal bearing plate 12 for rotatably supporting a bracket 14. The latter is U-shaped and has the base 15 thereof resting on the bearing plate 12.

A bolt 16 passes through the plate 12 and the base 15 so as to allow the bracket 14 to turn about the axis of the bolt with freedom of turning movement. A pair of wing nuts 17 are threaded on the bolt below the plate 12 in the manner shown in Figure 2.

It will be noted that the frame 2 includes an elongated bar 18, which normally is disposed in substantially upright position. The bar has a bracket 19 fastened thereto intermediate the ends of the bar by rivets 20, or other suitable fastening means.

The two legs 21 of the bracket 19 are hinged between the vertical sides 22 of the bracket 14 with freedom of turning movement about a horizontal pin 23. A spring 24 is coiled about the pin 23, as at 25, with the upper end 26 of the spring bearing against the bar 18 and the lower ends 27 of the spring resting against the base 15.

The spring has a tendency to urge the lower end 28 of the bar toward the supporting member 1, and I provide a stop 29 on the bracket 14, which limits the upward swinging of the bar 18 to the position shown in Figure 2.

At the upper end of the bar 18 I provide a clamp 30, that is adapted to encircle the handle 31 of the fishing rod. The clamp is composed of two sections 32 and 33, which are hinged together, as at 34, and a yielding catch 35 extends from the bar 18 and engages over a flange 36 on the section 32. For preventing the rod from turning, and in order to accommodate fishing rod handles of different diameters and shapes, I provide sponge rubber pads 37 on the inner faces of the clamps section, which are adapted to snugly embrace the rod handle.

The lower end of the rod handle is introduced into a cup 38, the latter being slidably secured upon the bar 18 by means of a slide 39. In Figure 2 I show the bar 18 as having a number of perforations 40 fashioned therein. A leaf spring 41 is fastened to the cup, as at 42, and carries a pin 43 adapted for introduction into any one of the perforations so as to hold the cup in adjusted positions on the bar 18. The cup may be adjusted lengthwise of the bar so as to accommodate rod handles of various lengths.

In Figure 1, I show a reel 44 of conventional design, including a crank 45, a friction and ratchet adjustment 46 and a stop 47. The reel has a line 48 wound thereon, which extends along the length of the pole and passes through eyelets (not shown) in the usual manner.

Having described the various parts of my fishing rod holder, the operation thereof may be readily understood. The spike 5 is first secured to a suitable anchorage, and the rod is fastened to the frame 2 by means of the clamp 30 and the cup 38.

As soon as a fish strikes the hook and starts pulling on the line, the rod 4 is permitted to swing on the pin 23 toward a horizontal position. This swinging movement is resisted by the spring 24, and upon the fish releasing the pull, the rod is again returned to its normal and substantially upright position. The rod is free to also swing horizontally on the bolt 16.

It will be understood that the bracket 14 may be secured to any suitable means, such as to a boat or other supporting surface, and I have shown the spike 5 only by means of illustration.

The frame 2 is always urged into upright position and this takes up any slack that may develop in the line after the rod has been pulled toward a horizontal position.

I claim:

1. A fishing rod holder comprising a supporting member, a bracket pivotally mounted on the top of the supporting member for swinging movement around a vertical axis, a second bracket hinged to the first bracket for swinging movement about a horizontal axis, a bar fixed to the second bracket and being movable into substantially upright position, yielding means urging the bar into said upright position, means for securing a fishing rod to the bar, and a stop projecting from the first named bracket into the path of the lower part of the bar for limiting the upward swinging of the top of the bar, the stop being arranged to maintain its position in the path of the bar as said first bracket is turned about said vertical axis.

2. A fishing rod holder comprising a supporting member, a bracket pivotally mounted on the top of the supporting member for swinging movement around a vertical axis, a second bracket hinged to the first bracket for swinging movement about a horizontal axis, a bar secured intermediate of its ends to the second bracket and being movable into substantially upright position, a spring bearing against the bar above the brackets and arranged to urge the lower part of the bar toward the supporting member, means for securing a fishing rod to the bar, and a stop projecting from the first named bracket into the path of the lower part of the bar for limiting the upward swinging of the top of the bar, the stop being arranged to maintain its position in the path of the bar as said first bracket is turned about said vertical axis.

3. A fishing rod holder comprising an upright spike made to be driven into an anchorage and having a horizontal bearing plate at the top thereof, a substantially U-shaped bracket having its base pivotally mounted on said bearing plate, the sides of said bracket extending upwardly and spaced apart to allow a tool to strike on the base of said bracket for driving the spike into an anchorage, a second U-shaped bracket having its sides pivoted to the sides of the first bracket for swinging movement about a horizontal axis, a frame secured to the second bracket having means for fastening a fishing rod thereto, the frame being swingable into substantially upright position, and a spring coiled about the pivot between said brackets with one end of the spring engaging the first bracket, the other end of the spring passing between the sides of the second bracket and bearing against the frame for urging the latter into substantially upright position.

4. A fishing rod holder comprising a support, a rod carrier, means interconnecting said carrier and support for normally free movement of said carrier relative to said support on horizontal and vertical axes, means limiting pivotal movement of said carrier about said horizontal axis in one direction, and yielding means opposing pivotal movement of said carrier about said horizontal axis in the other direction.

5. A fishing rod holder comprising a support having a horizontal bearing plate at the top thereof, a bracket having a vertical arm and a base pivotally mounted on said bearing plate, a rod carrier pivoted to said arm on a horizontal axis, and a spring coiled about said last named pivot with one end of the spring engaging the bracket and the other end of the spring bearing against said carrier for urging the latter into substantially upright position.

RAYMOND P. PARISIO.